(12) United States Patent
Ueno et al.

(10) Patent No.: US 6,923,849 B2
(45) Date of Patent: Aug. 2, 2005

(54) HYDROCARBON ADSORBENT STATE DETERMINING APPARATUS

(75) Inventors: Masaki Ueno, Saitama-ken (JP);
Hideharu Yamazaki, Saitama-ken (JP);
Shiro Takakura, Saitama-ken (JP);
Yasuyuki Miyahara, Saitama-ken (JP);
Tetsuo Endo, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 66 days.

(21) Appl. No.: 10/608,156

(22) Filed: Jun. 30, 2003

(65) Prior Publication Data
US 2004/0003723 A1 Jan. 8, 2004

(30) Foreign Application Priority Data
Jul. 3, 2002 (JP) .................................. 2002-194626

(51) Int. Cl.$^7$ ............................................. B01D 53/04
(52) U.S. Cl. .................. 96/110; 55/385.3; 55/DIG. 30; 96/111; 96/112; 96/115; 123/519
(58) Field of Search ........................... 96/110–112, 115; 55/385.3, 523, DIG. 10, DIG. 30; 123/518–520

(56) References Cited

U.S. PATENT DOCUMENTS 5,595,580 A * 1/1997 Kawamura .................. 55/288
6,383,267 B1 * 5/2002 Takaku et al. ............... 96/111
6,694,727 B1 * 2/2004 Crawley et al. .............. 60/295
2004/0060445 A1 * 4/2004 Fujimoto ..................... 96/110

* cited by examiner

Primary Examiner—Robert H. Spitzer
(74) Attorney, Agent, or Firm—Arent Fox, PLLC

(57) ABSTRACT

A hydrocarbon adsorbent state determining apparatus is provided for compensating the ability of a hydrocarbon adsorbent to adsorb moisture for fluctuations due to a change in the flow velocity of exhaust gases to accurately determine the state of the hydrocarbon adsorbent, including a deterioration thereof, irrespective of the change in the flow rate of exhaust gases. The hydrocarbon adsorbent state determining apparatus determines the state of a hydrocarbon adsorbent disposed in an exhaust system of an internal combustion engine for adsorbing hydrocarbons and moisture within exhaust gases. The hydrocarbon adsorbent state determining apparatus comprises a downstream humidity sensor for detecting the humidity of exhaust gases which have passed through the hydrocarbon adsorbent, a flow velocity parameter detector for detecting a flow velocity parameter indicative of a flow velocity of the exhaust gases, and an ECU for determining the state of the hydrocarbon adsorbent in accordance with the detected humidity of the exhaust gases and the flow velocity parameter.

4 Claims, 9 Drawing Sheets

HYDROCARBON ADSORBENT STATE DETERMINING APPARATUS

BACKGROUND OF THE INVENTION

1. Field of the Invention

The present invention relates to a hydrocarbon adsorbent state determining apparatus for determining the state of an adsorbent, including a deterioration thereof, arranged in an exhaust system of an internal combustion engine for adsorbing hydrocarbons and moisture within exhaust gases.

2. Description of the Prior Art

Some internal combustion engines are provided with an adsorbent for adsorbing hydrocarbons in exhaust gases upon starting. The adsorbent has, for example, zeolite on the surface such that hydrocarbons in exhaust gases introduce into pores of zeolite when they pass through the adsorbent, and are adsorbed by the adsorbent. The adsorbent desorbs the hydrocarbons once adsorbed thereby when the adsorbent is heated by exhaust gases to a predetermined temperature or higher (for example, 100–250° C.), permitting the desorbed hydrocarbons to be recirculated to the internal combustion engine through an EGR pipe and the like and processed without being emitted to the atmosphere. While the adsorbent repeats the adsorption and desorption of hydrocarbons as described above, the remaining amount of hydrocarbons not desorbed may gradually increase in the adsorbent, or pores of the adsorbent may be broken during a long-term use. As a result, the adsorbent is deteriorated, causing a gradual degradation in the ability of the adsorbent to adsorb the hydrocarbons. When the internal combustion engine is started with such a deteriorated adsorbent, hydrocarbons not adsorbed by the adsorbent are emitted to the outside. It is therefore necessary to determine the state, more particularly, a deterioration of the adsorbent.

The applicant has already proposed an adsorbent state determining apparatus for determining a deterioration of an adsorbent as described above, for example, in Japanese Patent Application No. 2001-323811. This state determining apparatus determines a degradation of the adsorbent in the ability to adsorb hydrocarbons, i.e., a deterioration of the adsorbent by detecting the humidity of exhaust gases using a humidity sensor, with attention focused on the fact that the adsorbent has the abilities to adsorb hydrocarbons and moisture which are highly correlated to each other, and that the humidity of exhaust gases passing through the adsorbent reflects the ability of the adsorbent to adsorb moisture. Specifically, the state determining apparatus measures a time actually taken by a detected humidity of exhaust gases, which have passed through the adsorbent, by a predetermined value associated with the adsorbent tending to be saturated with moisture within the exhaust gases adsorbed thereby after the start of the engine. Then, the state determining apparatus determines that the adsorbent is deteriorated when the measured time is shorter than a predetermined time, from the fact that the detected humidity rises at a high rate, indicating that the moisture adsorbing ability is degraded.

As described above, the state determining apparatus employs the time taken by the humidity of exhaust gases which have passed through the adsorbent after the start of the internal combustion engine by the predetermined value as a parameter representative of the ability of the adsorbent to adsorb moisture to determine the state of the adsorbent including a deterioration. However, the ability of the adsorbent to adsorb moisture varies depending on the flow velocity of exhaust gases which can fluctuate depending on an operating condition of the internal combustion engine and the like. For example, the ability of the adsorbent to adsorb moisture is degraded as exhaust gases flow at a higher velocity. Presumably, this is because exhaust gases come in contact with the adsorbent with a lower probability for a shorter time as the exhaust gases flow at a higher velocity (more likely to pass through the adsorbent), resulting in a lower apparent ability of the adsorbent to adsorb moisture. For this reason, when exhaust gases flow at a high velocity, the state determining apparatus can erroneously determine, from the under-evaluated ability of the adsorbent to adsorb moisture, that the adsorbent is deteriorated though it is in fact normal. On the other hand, when exhaust gases flow at a low velocity, the state determining apparatus can erroneously determine, from the over-evaluated ability of the adsorbent to adsorb moisture, that the adsorbent is normal though it is in fact deteriorated. Thus, the state determining apparatus can fail to ensure a sufficient accuracy for determining a deterioration of the adsorbent, and therefore still leaves room for improvement in this respect.

OBJECT AND SUMMARY OF THE INVENTION

The present invention has been made to solve the problem mentioned above, and it is an object of the invention to provide a hydrocarbon adsorbent state determining apparatus which is capable of compensating the ability of a hydrocarbon adsorbent to adsorb moisture for fluctuations due to a change in the flow velocity of exhaust gases to accurately determine the state of the hydrocarbon adsorbent, including a deterioration thereof, irrespective of the change in the flow velocity of exhaust gases.

To achieve the above object, the present invention provides a hydrocarbon adsorbent state determining apparatus for determining a state of a hydrocarbon adsorbent disposed in an exhaust system of an internal combustion engine for adsorbing hydrocarbons and moisture in exhaust gases. The hydrocarbon adsorbent state determining apparatus is characterized by comprising humidity detecting means for detecting the humidity of exhaust gases which have passed through the hydrocarbon adsorbent; flow velocity parameter detecting means for detecting a flow velocity parameter indicative of a flow velocity of the exhaust gases; and adsorbent state determining means for determining the state of the hydrocarbon adsorbent in accordance with the detected humidity of the exhaust gases and the flow velocity parameter.

This hydrocarbon adsorbent state determining apparatus detects the humidity of exhaust gases which have passed through the hydrocarbon adsorbent, detects a flow velocity parameter indicative of a flow velocity of the exhaust gases, and determines the state of the hydrocarbon adsorbent in accordance with these detected humidity of the exhaust gases and flow velocity parameter. The adsorbent has the abilities to adsorb hydrocarbons and moisture which are highly correlated to each other, and the humidity of exhaust gases passing through the hydrocarbon adsorbent reflects the ability of the adsorbent to adsorb moisture. Also, as described above, the ability of the hydrocarbon adsorbent to adsorb moisture varies in accordance with the flow velocity of exhaust gases. It is therefore possible to compensate the hydrocarbon adsorbent for fluctuations in its ability to adsorb moisture due to a change in the flow velocity of exhaust gases by using the flow velocity parameter, in addition to the humidity of exhaust gases which have passed through the hydrocarbon adsorbent, as a parameter for determining the state of the hydrocarbon adsorbent.

Consequently, the state of the hydrocarbon adsorbent, including a deterioration, can be determined with high accuracy irrespective of the exhaust gas flow velocity.

Preferably, in the hydrocarbon adsorbent state determining apparatus, the adsorbent state determining means determines the state of the hydrocarbon adsorbent in accordance with a change in a detected value of the humidity detecting means from a start of the internal combustion engine.

Moisture within exhaust gases is initially adsorbed by the hydrocarbon adsorbent after the internal combustion engine is started. Subsequently, at the time the hydrocarbon adsorbent is saturated in accordance with its ability to adsorb moisture, a portion of moisture which can no longer be adsorbed by the hydrocarbon adsorbent passes therethrough. Therefore, the humidity of exhaust gases which have passed through the hydrocarbon adsorbent is maintained low until the saturation of the hydrocarbon adsorbent, and changes toward a high humidity region immediately after the saturation. As such, a changing state including the change timing reflects the ability of the hydrocarbon adsorbent to adsorb moisture. Thus, according to this preferred embodiment of the hydrocarbon adsorbent state determining apparatus, the state of the hydrocarbon adsorbent can be more accurately determined in accordance with a change in the detected value of the humidity detecting means from the start of the internal combustion engine.

Preferably, the hydrocarbon adsorbent state determining apparatus further comprises a temperature state detecting means for detecting a temperature state of the hydrocarbon adsorbent, wherein the adsorbent state determining means determines the state of the hydrocarbon adsorbent in accordance further with the temperature state of the hydrocarbon adsorbent upon start of the internal combustion engine detected by the temperature state detecting means.

The ability of the hydrocarbon adsorbent to adsorb moisture varies depending on its temperature state. Therefore, according to this preferred embodiment of the hydrocarbon adsorbent state determining apparatus, when the state of the hydrocarbon adsorbent is determined in accordance further with the temperature state of the hydrocarbon adsorbent upon start of the internal combustion engine, the state determination can be made with higher accuracy while actual temperature state of the hydrocarbon adsorbent is reflected to the determination upon start of the internal combustion engine and after the start.

Preferably, the hydrocarbon adsorbent state determining apparatus further comprises upstream humidity detecting means disposed at a location upstream of the hydrocarbon adsorbent in the exhaust system for detecting the humidity of exhaust gases which flow into the hydrocarbon adsorbent, wherein the adsorbent state determining means determines the state of the hydrocarbon adsorbent in accordance further with the humidity detected by the upstream humidity detecting means.

According to this preferred embodiment of the hydrocarbon adsorbent state determining apparatus, the humidity of exhaust gases flowing into the hydrocarbon adsorbent (upstream humidity) is detected at a location upstream of the hydrocarbon adsorbent, in addition to the humidity of exhaust gases which have passed through the hydrocarbon adsorbent, and the state of the hydrocarbon adsorbent is determined in accordance further with the detected upstream humidity. Consequently, the detected upstream humidity can be based to precisely estimate a timing at which exhaust gases actually reach the hydrocarbon adsorber after the internal combustion engine is started, thereby more accurately determining the state of the hydrocarbon adsorbent.

DETAILED DESCRIPTION OF THE EMBODIMENT

Figure 1:
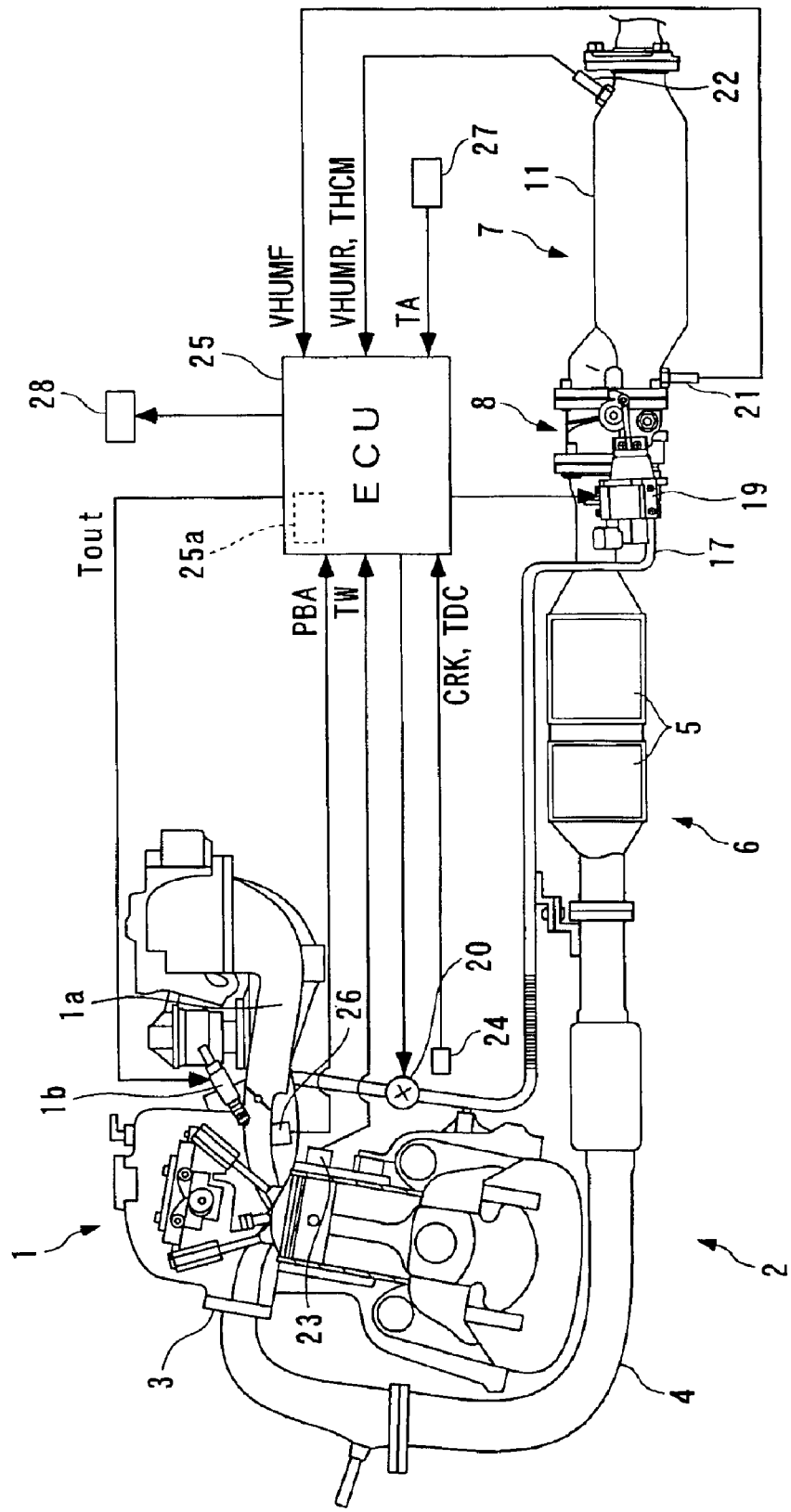
FIG. 1 is a diagram illustrating the configuration of an internal combustion engine which applies a hydrocarbon adsorbent state determining apparatus according to one embodiment of the present invention.

In the following, a preferred embodiment of the present invention will be described in detail with reference to the accompanying drawings. FIG. 1 illustrates an internal combustion engine 1 which employs an adsorbent state determining apparatus according to one embodiment of the present invention. The internal combustion engine (hereinafter simply referred to the "engine") 1 is, for example, a four-cylinder four-cycle engine equipped in a vehicle, not shown. The engine 1 has an intake pipe 1a which is provided with an injector 1b associated with each cylinder, and a fuel injection time Tout of the injector 1b is controlled by an engine control unit (ECU) 25, later described.

The engine 1 comprises an exhaust system 2 which has an exhaust pipe 4 connected to the engine 1 through an exhaust manifold 3. A catalyzer 6 having two three-way catalysts 5 for purifying exhaust gases, and a hydrocarbon adsorber 7 for adsorbing hydrocarbons are provided at intermediate locations in the exhaust pipe 4. The two three-way catalysts 5 are arranged adjacent to each other along the exhaust pipe 4. The three-way catalysts 5, when activated at or above a predetermined temperature (for example, 300° C.), purify harmful substances (hydrocarbons (HC), carbon monoxide (CO) and nitrogen compounds (NOx)) in exhaust gases passing through the catalyzer 6 by oxidation-reduction catalyst actions.

Figure 2:
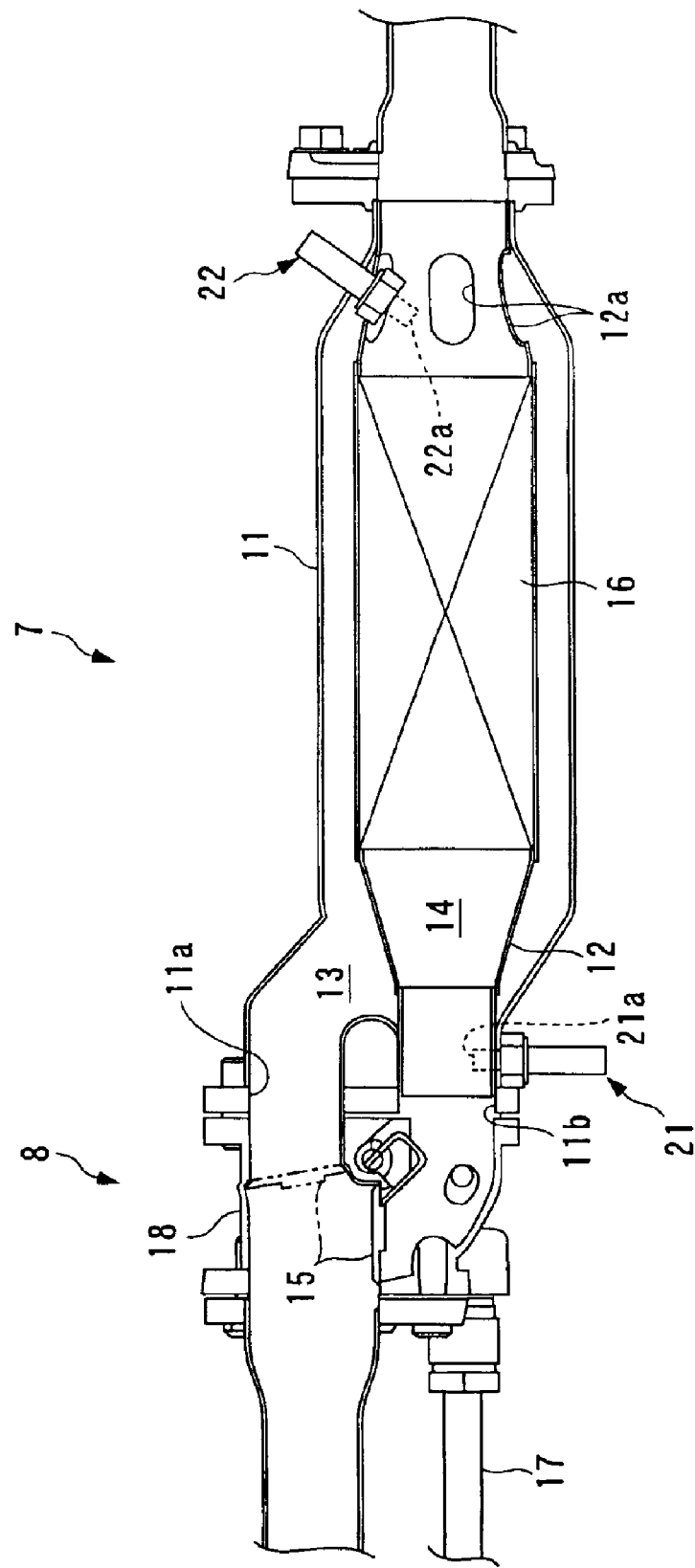
FIG. 2 is an enlarged cross-sectional view illustrating a hydrocarbon adsorber.

The hydrocarbon adsorber 7, in turn, is arranged in the exhaust pipe 4 at a location downstream of the catalyzer 6 for adsorbing hydrocarbons within exhaust gases during a starting period (for example, about 30–40 seconds after the start) of the engine 1 in a cold state in which the three-way catalysts 5 have not been activated, thereby reducing the amount of hydrocarbons emitted to the atmosphere. As illustrated in FIGS. 1 and 2, the hydrocarbon adsorber 7 is coupled to a downstream end of the catalyzer 6 through an exhaust passage switch 8. The hydrocarbon adsorbent 7 comprises a cylindrical case 11; a bypass exhaust pipe 12 arranged within the case 11; and a cylindrical hydrocarbon adsorbent (hereinafter simply called the "adsorbent") 16 filled in the middle of the bypass exhaust pipe 12 for adsorbing hydrocarbons contained in exhaust gases which flow into the bypass exhaust pipe 12.

As illustrated in FIG. 2, a main passage 13 is defined by an annular space in cross section between the case 11 and bypass exhaust pipe 12, and a bypass passage 14 is defined by an internal space of the bypass exhaust pipe 12. The case 11 has its upstream end branched into two: an upper opening 11a in communication with the main passage 13, and a lower opening 11b in communication with the bypass passage 14.

The bypass exhaust pipe 12 has its upstream end hermetically connected to the inner wall of the lower opening 11b of the case 11, and its downstream end likewise hermetically connected to the inner wall of a downstream end of the case 11. The bypass exhaust pipe 12 is formed with a plurality (for example, five) of elongated communication holes 12a formed in a downstream end portion at equal intervals from one another in the circumferential direction. The main passage 13 and the bypass passage 14 have their downstream ends communicating with each other through these communication holes 10a.

The adsorbent 16 is comprised of a honeycomb core (not shown), made of a metal, which carries zeolite on its surface, and has the property of adsorbing moisture as well as hydrocarbons, so that as exhaust gases flowing into the bypass passage 13 pass through the interior of the adsorbent 16, hydrocarbons and moisture contained in the exhaust gases are adsorbed by the zeolite. Zeolite, which has high heat resistant properties, adsorbs hydrocarbons in a low temperature state (for example, below 100° C.), and desorbs hydrocarbons once adsorbed thereby when it is heated to a predetermined temperature or higher (for example, 100–250° C.).

The exhaust passage switch 8 is provided for selectively switching the passage of exhaust gases downstream of the catalyzer 6 to the main passage 13 and to the bypass passage 14 depending on whether the three-way catalysts 5 are activated. The exhaust passage switch 8 has a cylindrical connecting pipe 18; and a switching valve 15 pivotably arranged within the connecting pipe 18. The switching valve 15 is driven by a switching valve driver 19 (see FIG. 1) controlled by an ECU 25, to switch the exhaust passage to the main passage 13 when it is positioned as indicated by solid lines in FIG. 2, and the exhaust passage to the bypass passage 14 when it is positioned as indicated by two-dot chain lines.

An EGR pipe 17 is coupled between the connecting pipe 18 and intake pipe 1a of the engine 1 for recirculating a portion of exhaust gases to the engine 1. An EGR control valve 20 is disposed at an intermediate location of the EGR pipe 17. The EGR control valve 20 is controlled by the ECU 25 to control activation/stoppage of the EGR as well as an EGR amount.

According to the foregoing configuration, the exhaust passage is switched to the bypass passage 14 by the exhaust passage switch 8 immediately after a cold start of the engine 1, thereby introducing exhaust gases passing through the catalyzer 6 into the bypass passage 14. After hydrocarbons contained in the exhaust gases have been adsorbed by the adsorbent 16, the exhaust gases are emitted to the atmosphere. Subsequently, when hydrocarbons have been fully adsorbed by the adsorbent 16, the exhaust passage is switched to the main passage 13 by the switching valve 15 at a switching timing, later described, thereby introducing the exhaust gases into the main passage 13 through the connecting pipe 15 to emit the exhaust gases to the atmosphere. Also, as the EGR control valve 20 is opened to operate the EGR, a portion of the exhaust gases is recirculated to the intake pipe 1a through the bypass passage 14 and EGR pipe 17 as an EGR gas. Hydrocarbons desorbed from the adsorbent 16 are sent to the intake pipe 1a by the EGR gas and burnt by the engine 1.

Figure 7:
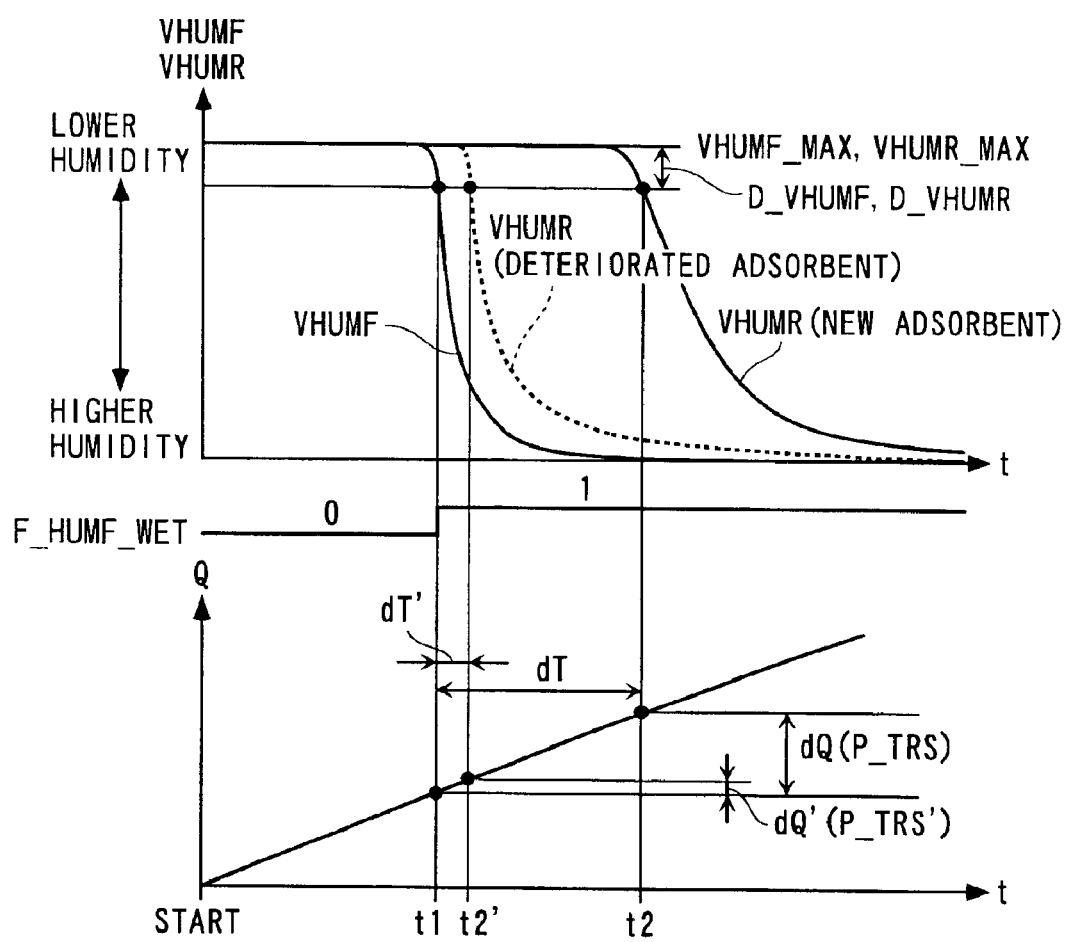
FIG. 7 is a timing chart showing an exemplary determination resulted from the deterioration determination routine.

The case 11 of the hydrocarbon adsorber 7 is also provided with an upstream humidity sensor 21 and a downstream humidity sensor 22 at locations upstream and downstream of the adsorbent 11, respectively. Each of the humidity sensors 21, 22 has a sensor element 21a, 22a (see FIG. 2) attached to face the bypass passage 14. The upstream humidity sensor 21 applies the ECU 25 with a detected upstream humidity value VHUMF indicative of the humidity of exhaust gases flowing into the adsorbent 16, while the downstream humidity sensor 22 applies the ECU 25 with a detected downstream humidity value VHUMR indicative of the humidity of the exhaust gases which have passed through the adsorbent 16. Each of the sensor elements 21a, 22a is comprising a porous body, for example, made of alumina, titania or the like. Taking advantage of the characteristic that its resistance value varies in accordance with the amount of moisture adsorbed into pores of the sensor element 21a, 22a, each of the humidity sensors 21, 22 detects the humidity, and outputs a voltage value corresponding to the detected humidity as the detection signal. Thus, as shown in FIG. 7, both detected upstream and downstream humidity values VHUMF, VHUMR present lower values as the humidity is higher, in other words, an inverse increase/decrease characteristic to the actual humidity. The downstream humidity sensor 22 is integrated with a temperature sensor for detecting a temperature THCM of exhaust gases which have passed through the adsorbent 16, and outputting a detection signal indicative of the temperature THCM to the ECU 25.

The engine 1 is also provided with an engine water temperature sensor 23 and a crank angle sensor 24, both of which are attached on the body of the engine 1. The engine water temperature sensor 23 (temperature state detecting means) detects the temperature TW of cooling water circulating within a cylinder block of the engine 1 (hereinafter called the "engine water temperature"), and sends a detection signal indicative of the engine water temperature TW to the ECU 25. The crank angle sensor 24 (flow velocity parameter detecting means) in turn outputs a CRK signal and a TDC signal, which are both pulse signals, to the ECU 25 every predetermined crank angle as a crank shaft, not shown, of the engine 1 is rotated. The ECU 25 calculates a rotational speed NE of the engine 1 (hereinafter called the "engine rotational speed") based on the CRK signal. The ECU 25 is also applied with a detection signal indicative of an absolute pressure PBA within the intake pipe 1a (hereinafter called the "absolute intake pipe inner pressure) from an intake pressure sensor 26 attached on the intake pipe 1a, and a detection signal indicative of an intake air temperature TA within the intake pipe 1a from an intake air temperature sensor 27, respectively. An alarm lamp 28 is also connected to the ECU 25. The alarm lamp 28 is turned on when the adsorbent 16 is determined to be deteriorated.

In this embodiment, the ECU 25 comprises a flow velocity parameter detecting means and an adsorbent state determining means. The ECU 25 may be based on a microcomputer which is comprised of an I/O interface, a CPU, a RAM, a ROM, and the like (neither not shown). The ECU 25 also comprises a post-start timer 25a for measuring an elapsed time after the engine 1 is started. Respective signals detected by a variety of the aforementioned sensors are inputted to the CPU after subjected to A/D conversion, waveform reshaping and the like in the I/O interface.

The CPU determines an operating condition of the engine 1 based on engine parameter signals detected by a variety of sensors as mentioned above, calculates a fuel injection time Tout in accordance with the result of determination in synchronism with the generation of a TDC signal, and outputs a driving signal based on the result of calculation to the injector 1b. The CPU also controls the switching valve driver 19 to open and close the switching valve 15 in response to detection signals from the variety of sensors in accordance with a control program, tables and the like stored in the ROM, executes a deterioration determination for determining the state of the adsorbent 16.

Figure 3:
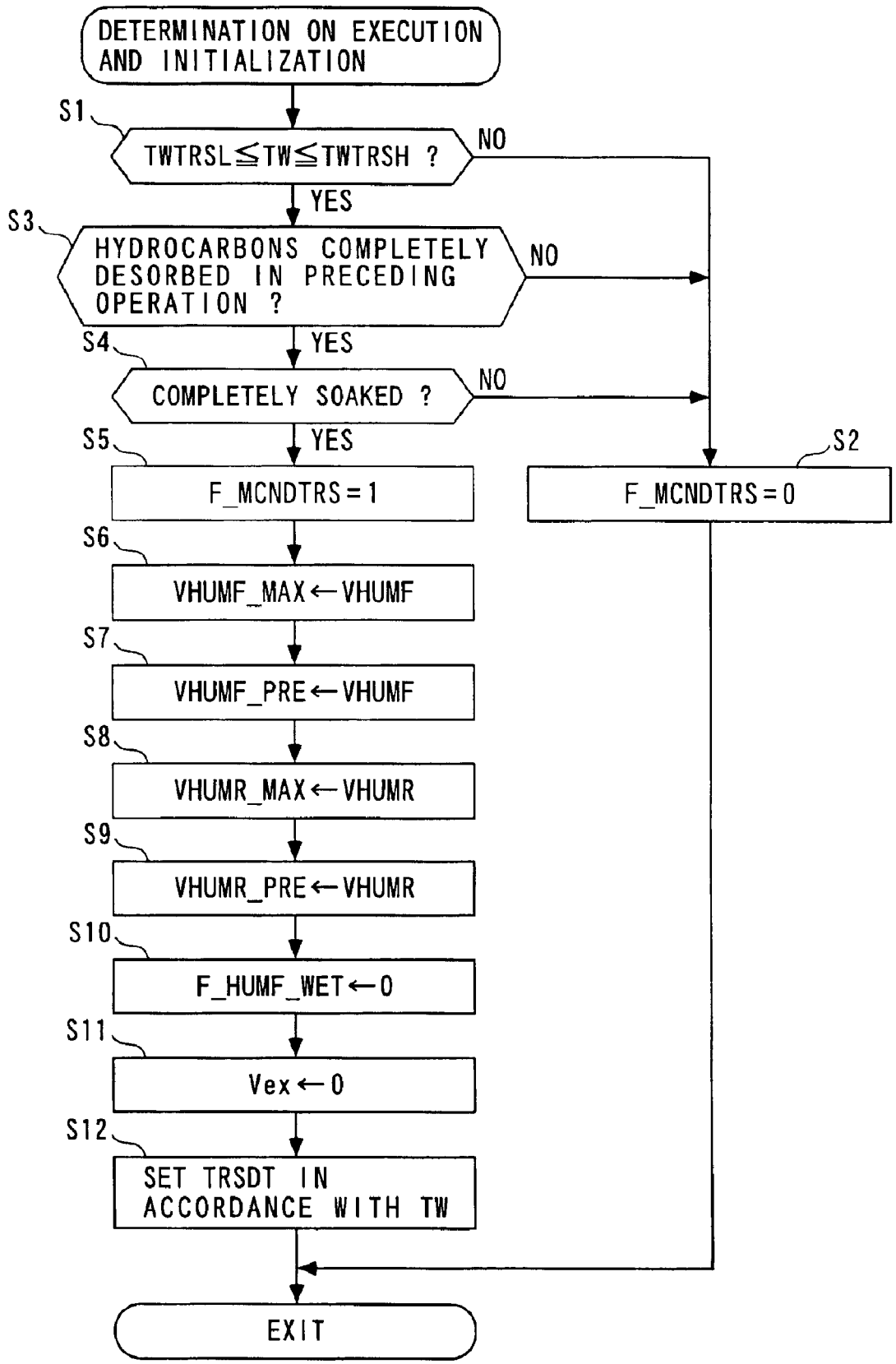
FIG. 3 is a flow chart illustrating a routine for determination on execution of a deterioration determination for the adsorbent, and initialization.

Next, the deterioration determination for the adsorbent 16 will be described with reference to FIGS. 3 to 7. FIG. 3 illustrates a routine for determining whether or not the deterioration determination is executed for the adsorbent 16, and for initializing a variety of parameters for determining a deterioration. This routine is executed only once immediately after the engine 1 is started.

In this routine, the CPU first determines at step 1 (labeled as "S1" in the figure. This designation is applied to the following description) whether or not the engine temperature TW is equal to or higher than a predetermined lower limit value TWTRSL (for example, 0° C.) and equal to or lower than a predetermined upper limit value TWTRSH (for example, 40° C.). If the answer to step 1 is NO, indicating that the engine water temperature TW at the start is out of a predetermined temperature range defined by the upper and lower limit values TWTRSL and TWTRSH, the CPU sets a deterioration determination enable flag F_MCNDTRS to "0" on the assumption that the execution condition is not met for the deterioration determination for the adsorbent 16 (step 2), followed by termination of this routine.

On the other hand, if the answer to step 1 is YES, indicating that the engine water temperature TW falls within the predetermined temperature range, the CPU determines whether or not hydrocarbons have been completely desorbed from the adsorbent (step 3). This determination is made, for example, based on whether or not the detected temperature value THCM of the downstream humidity sensor 22 has reached a desorption temperature (for example, 220° C.) during desorption after the preceding start of the engine, or whether or not the EGR amount has reached a predetermined amount. If the answer to step 3 is NO, indicating that hydrocarbons have not been completely desorbed during the preceding operation, the CPU executes step 2 to disable the deterioration determination on the assumption that hydrocarbons remaining on the adsorbent 16 could prevent a proper deterioration determination for the adsorbent 16.

On the other hand, if the answer to step 3 is YES, the CPU determines whether or not the engine 1 is completely soaked, i.e., whether or not a soak time from the preceding stop to the current start of the engine 1 is sufficiently long (step 4). This determination is made, for example, based on whether or not the difference TW-TA between the engine water temperature TW and intake air temperature TA at the start is within a predetermined temperature (for example, 5° C.). If the answer to step 4 is NO, indicating that the engine 1 is not completely soaked, the CPU executes step 2 to disable the deterioration determination on the assumption that the adsorbent 16 has not been sufficiently cooled down so that the deterioration determination cannot be made properly.

On the other hand, if the answer to step 4 is YES, the CPU sets the deterioration determination enable flag F_MCNDTRS to "1" on the assumption that the execution condition is met for the deterioration determination for the adsorbent 16 (step 5).

Next, the CPU initializes parameters for use in the deterioration determination at steps 6–12. First, the CPU sets the upstream humidity value VHUMF detected by the upstream humidity sensor 21 at the current time as an initial value for a maximum upstream humidity value VHUMF_MAX and a preceding upstream humidity value VHUMF_PRE thereof, respectively (steps 6, 7). Similarly, the CPU sets the downstream humidity value VHUMR detected by the downstream humidity sensor 22 at the current time as an initial value for a maximum downstream humidity value VHUMR_MAX and a preceding downstream humidity value VHUMR_PRE, respectively (steps 8, 9).

Next, the CPU resets an upstream rise flag F_HUMF_WET to "0" (step 10). The upstream rise flag F_HUMF_WET indicates that the detected upstream humidity value VHUMF changes (rises) to a high humidity region when it is at "1." The CPU also resets an accumulated inflow exhaust gas amount Vex to "0" (step 11). Next, the CPU searches a deterioration determination threshold table (hereinafter called the "TRSDT table") shown in FIG. 4 in accordance with the engine temperature water TW to set a deterioration determination threshold TRSDT for the deterioration determination for the adsorbent 16 (step 12), followed by termination of the routine.

Figure 4:
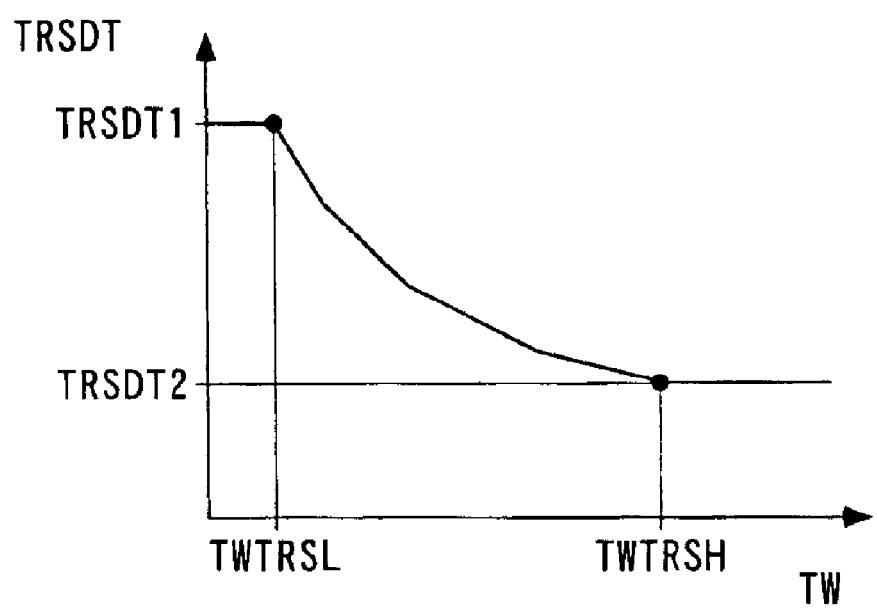
FIG. 4 is a deterioration determination threshold table for setting a deterioration determination threshold TRSDT in accordance with an engine water temperature TW upon start of the engine.

As shown in FIG. 4, in the TRSDT table, the deterioration determination threshold TRSDT is set at a first predetermined value TRSDT1 when the engine water temperature TW is equal to the aforementioned lower limit value TWTRSL, and at a second predetermined value TRSDT2 smaller than the first predetermined value TRSDT1 when the engine water temperature TW is equal to the upper limit value TWTRSH, respectively. Between the upper and lower limit values TWTRSH and TWTRSL, the deterioration determination threshold TRSDT is set at a larger value as the engine water temperature TW is lower.

Figure 5:
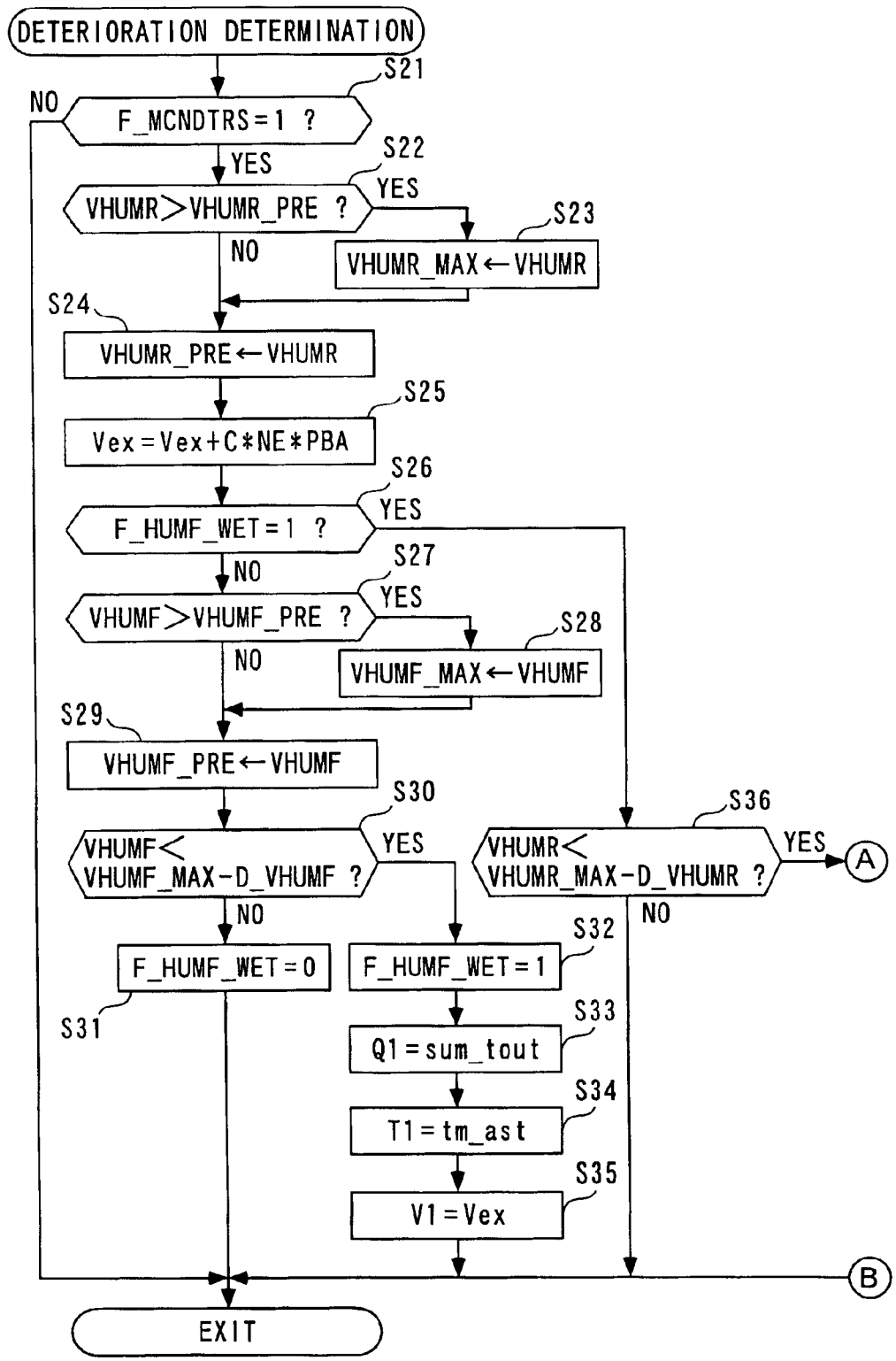
FIGS. 5 and 6 are flow charts illustrating in combination a routine for determining a deterioration of the adsorbent.
Figure 6:
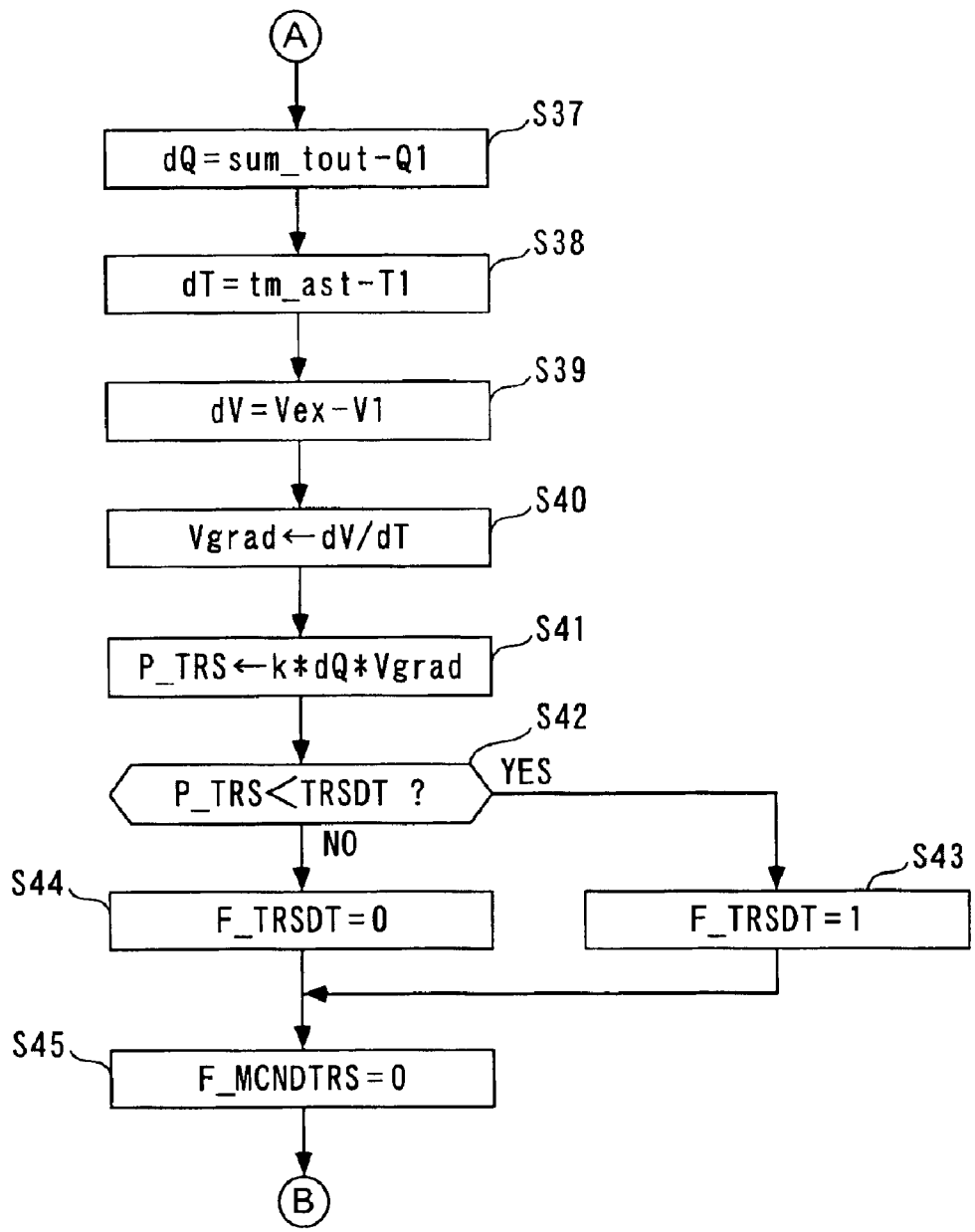

FIGS. 5 and 6 illustrates a routine for determining a deterioration of the adsorbent 16. This routine is executed in synchronism at predetermined time intervals (for example, every 100 ms). First, the CPU determines whether or not the deterioration determination enable flag F_MCNDTRS is "1" (step 21). If the answer to step 21 is NO, indicating that the execution condition is not met for the deterioration determination, the deterioration determination routine is terminated without further processing.

On the other hand, if the answer to step 21 is YES, indicating that the execution condition is met for the deterioration determination, the CPU determines whether or not the currently detected downstream humidity value VHUMR is higher than the preceding downstream humidity value VHUMR_PRE (step 22). If the answer to step 22 is YES, indicating that VHUMR>VHUMR_PRE, the CPU sets the currently detected downstream humidity value VHUMR as the maximum downstream humidity value VHUMR_MAX (step 23). In this way, since the maximum downstream humidity value VHUMR_MAX is updated when the detected downstream humidity value VHUMR has increased from the previously detected value (the humidity is lower), the maximum downstream humidity value VHUMR_MAX indicates a maximum value (downstream minimum humidity equivalent value) until the humidity of exhaust gases downstream of the adsorbent 16 (hereinafter called the "downstream humidity") begins rising to the high humidity region (see FIG. 7). If the answer to step 22 is NO, or after the execution of step 23, the deterioration determination routine proceeds to step 24, where the CPU shifts the currently detected downstream humidity value VHUMR to the preceding downstream humidity value VHUMR_PRE.

Next, the CPU calculates the accumulated inflow exhaust gas amount Vex in accordance with the following equation (1) (step 25):

$$Vex=Vex+C*NE*PBA \qquad (1)$$

where C is a predetermined conversion coefficient for converting the product of the engine rotational speed NE and absolute intake inner pressure PBA to the flow rate of exhaust gases.

As is apparent from the equation (1), the accumulated inflow exhaust gas amount is an accumulative sum of the preceding value thereof and the product of the engine rotational speed NE and the absolute intake inner pressure PBA, and is reset to the initial value of zero at step 11 in FIG. 3 upon start of the engine, as mentioned above. Therefore, the accumulated inflow exhaust gas amount Vex indicates the total amount of exhaust gases discharged from the engine 1 after the start.

Next, the CPU determines whether or not the upstream rise flag F_HUMF_WET is set to "1" (step 26). If the answer to step 26 is NO, indicating that the detected upstream humidity value VHUMF has not risen to the high humidity region, the CPU determines whether or not the currently detected upstream humidity value VHUMF is larger than the preceding upstream humidity value VHUMF_PRE (step 27), in a manner similar to the detected downstream humidity value VHUMR at steps 22–24. If the answer to step 27 is YES, indicating that VHUMF>VHUMF_PRE, the CPU sets the currently detected upstream humidity value VHUMF as the maximum upstream humidity value VHUMF_MAX (step 28). Therefore, the maximum upstream humidity value VHUMF_MAX indicates a maximum value (upstream minimum humidity equivalent value) until the humidity of exhaust gases upstream of the adsorbent 16 (hereinafter called the "upstream humidity") begins rising to the high humidity region (see FIG. 7). If the answer to step 27 is NO, or after the execution of step 28, the CPU shifts the currently detected upstream humidity value VHUMF to the preceding upstream humidity value VHUMF_PRE (step 29).

Next, the CPU determines whether or not the currently detected upstream humidity value VHUMF is smaller than the difference between the maximum upstream humidity value VHUMF_MAX set at step 28 and a predetermined rise determination deviation D_VHUMF (=VHUMF_MAX−D_VHUMF) (step 30). If the answer to step 30 is NO (before time t1 in FIG. 7), the CPU maintains the upstream rise flag F_HUMF_WET at "0" on the assumption that the detected upstream humidity value VHUMF has not risen to the high humidity region (step 31), followed by termination of the deterioration determination routine.

On the other hand, if the answer to step 30 is YES, indicating that VHUMF<(VHUMF_MAX-D_VHUMF) stands (time t1), the CPU sets the upstream rise flag F_HUMF_WET to "1" on the assumption that the detected upstream humidity value VHUMF has risen to the high humidity region (step 32).

Next, the CPU stores parameters associated with the determination as to whether or not the detected upstream humidity value VHUMF has risen to the high humidity region (time t1). Specifically, the CPU sets an accumulated value sum_tout of the fuel injection time tout accumulated to that time as the accumulated exhaust gas calory value Q1 at the time the upstream humidity rises to the high humidity region (step 33), sets the value tm-ast of the post-start timer 25a at that time as an upstream humidity rise time T1 (step 34), and sets the so far accumulated inflow exhaust gas amount Vex calculated at step 25 as an accumulated inflow exhaust gas amount V1 at the time the upstream humidity rises to the high humidity region (step 35), followed by termination of the deterioration determination routine. The accumulated exhaust gas calory value Q1 indicates the total amount of exhaust gas calory given to the adsorbent 16 from the start of the engine 1 to the time at which the upstream humidity rises to the high humidity region, and is calculated by accumulating the fuel injection time tout from the start, as mentioned above.

After the establishment of the detected upstream humidity value VHUMF rising to the high humidity region as mentioned above, the execution of step 32 causes the answer to step 26 to be YES, in which case the deterioration determination routine proceeds to step 36, where the CPU determines whether or not the detected downstream humidity value VHUMR rises to the high humidity region in a manner similar to the detected upstream humidity value VHUMF at step 30. Specifically, the CPU determines whether or not the currently detected downstream humidity value VHUMR is smaller than the difference between the maximum downstream humidity value VHUMR_MAX set at step 23 and a predetermined rise determination deviation D_VHUMR. If the answer to step 36 is NO (before time t2 in FIG. 7), the deterioration determination routine is terminated without further processing on the assumption that the detected downstream humidity value VHUMR has not risen to the high humidity region.

On the other hand, if the answer to step 36 is YES, indicating that VHUMR<(VHUMR_MAX-D_VHUMR) stands (time t2), the CPU calculates changing amounts of a variety of parameters from the time the upstream humidity has risen to the high humidity region to the time the downstream humidity has risen to the high humidity region at steps 37–39 in FIG. 6 on the assumption that the detected downstream humidity value VHUMR has risen to the high humidity region. Specifically, the CPU calculates the difference between an accumulated value sum_tout of the fuel injection time tout at that time and the accumulated exhaust gas calory Q1 at the time the upstream humidity rises to the high humidity region (=sum_tout−Q1) as an accumulated exhaust gas calory changing amount dQ (step 37). Thus, the accumulated exhaust gas calory changing amount dQ indicates the total amount of exhaust gas calory given to the adsorbent 16 from the time the upstream humidity has risen to the high humidity region to the time the downstream humidity has risen to the high humidity region. The CPU also calculates the difference between the value tm_ast of the post-start timer 25a at that time and the upstream humidity rise time T1 (=tm_ast−T1) as a time difference dT (step 38), and calculates the difference between the accumulated exhaust gas calory value Vex at that time and the accumulated exhaust gas calory value V1 at the time the upstream humidity rises to the high humidity region (=Vex−V1) as an accumulated inflow exhaust gas changing amount dV (step 39).

Next, the CPU divides the accumulated inflow exhaust gas changing amount dV by the time difference dT (=dQ/dT), and sets the resulting quotient as an exhaust gas flow velocity Vgrad (step 40). Specifically, the exhaust gas flow velocity Vgrad is an average of the exhaust gas flow rate during a time period from the rise of the upstream humidity detected by the upstream humidity sensor 21 to the rise of the downstream humidity detected by the downstream humidity sensor 22, and the cross-sectional area of the flow passage is invariable over time, so that the exhaust gas flow velocity Vgrad indicates an average flow velocity of exhaust gases during the time period from the rise of the upstream humidity detected by the upstream humidity sensor 21 to the rise of the downstream humidity detected by the downstream humidity sensor 22.

Next, the CPU calculates a deterioration determination parameter P_TRS in accordance with the following equation (2) using the exhaust gas flow velocity Vgrad and the accumulated exhaust gas calory changing amount dQ calculated at step 37 (step 41):

$$P\_TRS = k*dQ*V\text{grad} \qquad (2)$$

where k is an influence coefficient which indicates an extent to which the exhaust gas flow velocity influences the moisture adsorbing ability of the adsorbent 16, and is determined through experiments. In the foregoing manner, the deterioration determination parameter P_TRS is based on the accumulated exhaust gas calory changing amount dQ, i.e., the total amount of exhaust gas calory given to the adsorbent 16 from exhaust gases during the time period from the rise of the upstream humidity detected by the upstream humidity sensor 21 to the rise of the downstream humidity detected by the downstream humidity sensor 22, and is compensated by multiplying the accumulated exhaust gas calory changing amount dQ by the exhaust gas flow velocity Vgrad which indicates the exhaust gas flow velocity during the time period from the rise of the upstream humidity detected by the upstream humidity sensor 21 to the rise of the downstream humidity detected by the downstream humidity sensor 22. Therefore, the deterioration determination parameter P_TRS is set at a larger value as the exhaust gas flow velocity Vgrad is higher.

Next, the CPU determines whether or not the deterioration determination parameter P_TRS calculated as described above is smaller than the deterioration determination threshold TRSDT set at step 12 in FIG. 3 (step 42). If the answer to step 42 is YES, indicating that P_TRS<TRSDT, the CPU determines that the adsorbent 16 is deteriorated from the fact that the detected downstream humidity value VHUMR has risen at an early timing (for example, as indicated by a broken line VHUMR' in FIG. 7) although the adsorbent 16 has not been supplied with sufficient calory to bring the detected downstream humidity value VHUMR to the high humidity region, and sets the deterioration flag F_TRSDT to "1" for showing that the adsorbent 16 is deteriorated.

On the other hand, if the answer to step 42 is NO, indicating that P_TRSTRSDT, the CPU determines that the adsorbent 16 is not deteriorated from the fact that the detected downstream humidity value VHUMR rises to the high humidity region after the adsorbent 16 has been supplied with sufficient calory (for example, as indicated by a solid line VHUMR in FIG. 7), and sets the deterioration flag F_TRSDT to "0" (step 44).

At step 45 subsequent to step 43 or 44, the CPU sets the deterioration determination enable flag F_MCNDTRS to "0" in response to the termination of the deterioration determination for the adsorbent 16, followed by termination of the deterioration determination routine.

As described above, the hydrocarbon adsorbent state determining apparatus according to the foregoing embodiment determines that the adsorbent 16 is deteriorated by comparing the deterioration determination parameter P_TRS with the deterioration determination threshold TRSDT. As described above, the deterioration determination parameter P_TRS is based on the accumulated exhaust gas calory changing amount dQ and is compensated by the exhaust gas flow velocity Vgrad. Thus, the total amount of exhaust gas calory given to the adsorbent 16 is reflected to the deterioration determination parameter P_TRS, and the moisture adsorbing ability of the adsorbent 16 can be compensated for fluctuations due to a change in the exhaust gas flow velocity. As a result, the state determining apparatus can accurately determine whether or not the adsorbent 16 is deteriorated irrespective of the exhaust gas velocity.

Also, in the hydrocarbon adsorbent state determining apparatus, the accumulated exhaust gas calory changing amount dQ and exhaust gas flow velocity Vgrad are calculated as values during the time period from the rise of the detected upstream humidity value VHUMR to the high humidity region to the rise of the detected downstream humidity value VHUMR to the high humidity region, so that the deterioration determination parameter P_TRS can be found at an optimal timing in accordance with humidity changing conditions at the locations upstream and downstream of the adsorbent 16.

Figure 8:
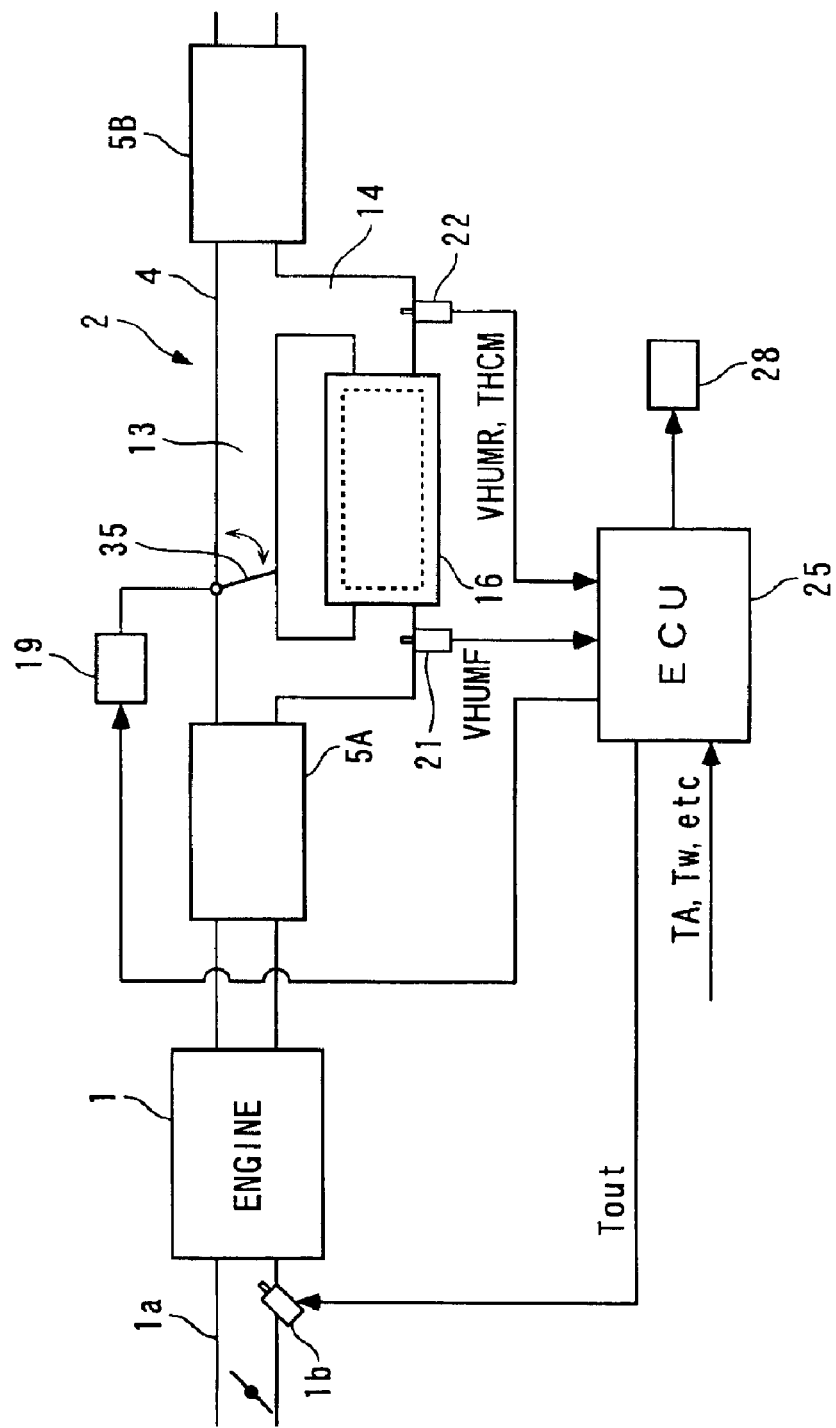
FIG. 8 is a block diagram illustrating the configuration of another hydrocarbon adsorbent state determining apparatus which applies the present invention.

FIG. 8 illustrates in block diagram form the configuration of another hydrocarbon adsorbent state determining apparatus which applies the present invention. This hydrocarbon adsorbent state determining apparatus differs from the counterpart illustrated in FIG. 1 only in the locations of the three-way catalysts and switching valve. Components in FIG. 8 having the same configuration or equivalent function are designated the same reference numerals, and detailed description thereon is omitted. As illustrated in FIG. 8, the hydrocarbon adsorbent state determining apparatus has a pair of upstream and downstream three-way catalysts 5A, 5B in the exhaust pipe 4 in the exhaust system 2 of the engine 1. The portion of the exhaust pipe 4 between the three-way catalysts 5A, 5B is branched into the main passage 13 and the bypass passage 14 which circumvents the main passage 13, and the adsorbent 16 is filled in the bypass passage 14. A switching valve 35 is disposed in the main passage 13, and is controlled by the ECU 25 to open and close through the switching valve driver 19. Also, as is the case with the hydrocarbon adsorbent state determining apparatus illustrated in FIG. 1, the bypass passage 14 is provided with the upstream humidity sensor 21 and downstream humidity sensor 22 at locations upstream and downstream of the adsorbent 16, respectively. The rest of the configuration is similar to the hydrocarbon adsorbent state determining apparatus illustrated in FIG. 1, including the routine for determining a deterioration of the adsorbent 16.

In the hydrocarbon adsorbent state determining apparatus configured as described above, the switching valve 35 is switched to the close position to fully close the main passage 13 upon cold start of the engine 1. In this state, exhaust gases passing through the upstream three-way catalyst 5A are all guided to the bypass passage 14, such that hydrocarbons in the exhaust gases are adsorbed by the adsorbent 16. Subsequently, the switching valve 35 is switched to the open position to fully open the main passage 13 after the upstream or downstream three-way catalyst 5A, 5B is activated. In this state, exhaust gases are purified by the activated upstream or downstream three-way catalyst 5A, 5B through its oxidation-reduction catalyst actions.

During a cold start of the engine 1 with exhaust gases guided to the adsorbent 16, the aforementioned routine for the deterioration determination illustrated in FIGS. 3 to 6 can be executed to determine a deterioration of the adsorbent 16 in a similar manner in accordance with a change in the state of the upstream and downstream humidity values VHUMF, VHUMR detected by the upstream and downstream humidity sensors 21, 22, respectively. Thus, this hydrocarbon adsorbent state determining apparatus can also provide similar advantages to those of the hydrocarbon adsorbent state determining apparatus in FIG. 1. Specifically, the deterioration determination can be made for the adsorbent 16 with high accuracy irrespective of the exhaust gas flow velocity, while compensating for fluctuations in the ability of the adsorbent 16 to adsorb moisture caused by a change in the exhaust gas flow velocity.

Figure 9:
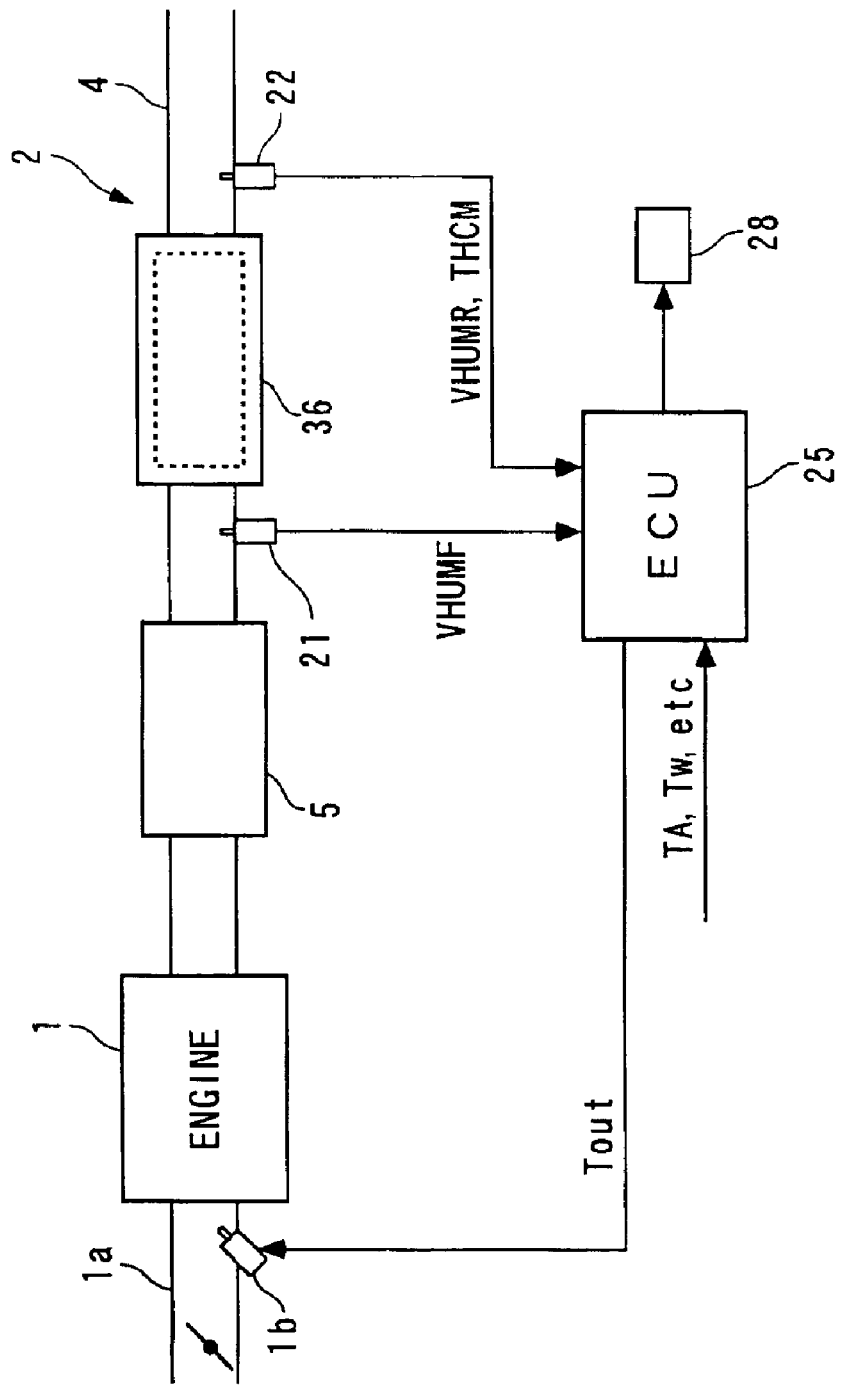
FIG. 9 is a block diagram illustrating the configuration of a further hydrocarbon adsorbent state determining apparatus which applies the present invention.

FIG. 9 illustrates the configuration of a further hydrocarbon adsorbent state determining apparatus which applies the present invention. Again, in FIG. 9, components having the same configuration as or equivalent function to those in the hydrocarbon adsorbent state determining apparatus illustrated in FIG. 1 are designated the same reference numerals. As illustrated in FIG. 9, this hydrocarbon adsorbent state determining apparatus has a three-way catalyst 5 disposed in the exhaust pipe 4 in the exhaust system 2 of the engine 1, and a hydrocarbon adsorbing catalyst 36 at a location downstream of the three-way catalyst 5. Though not shown, the hydrocarbon adsorbing catalyst 36 is of a hybrid type which comprises a hydrocarbon adsorbent and a three-way catalyst in a composite formation. Specifically, the hydrocarbon adsorbing catalyst 36 comprises a carrier in a honeycomb structure, the surface of which is coated with zeolite as a hydrocarbon adsorbent, and a noble metal such as platinum, palladium, rhodium or the like carried on the carrier as a catalyst. The upstream humidity sensor 21 and downstream humidity sensor 22 are disposed at locations upstream and downstream of the hydrocarbon adsorbing catalyst 36, respectively, in the exhaust pipe 4. The rest of the configuration is similar to the hydrocarbon adsorbent state determining apparatus in FIG. 1.

In the hydrocarbon adsorbent state determining apparatus, the hydrocarbon adsorbing catalyzer 36 acts as a hydrocarbon adsorbent during a cold start of the engine 1 in which the catalyst is not activated, to adsorb hydrocarbons within exhaust gases to the adsorbent, and subsequently acts as a three-way catalyst after the catalyst is activated to purify exhaust gases through the oxidation-reduction catalyst actions. During adsorption of hydrocarbons by the hydrocarbon adsorbing catalyst 36, the aforementioned routine for the deterioration determination can be executed to determine a deterioration of the hydrocarbon adsorbing catalyst 36 with respect to its ability to adsorb hydrocarbons in accordance with a change in the states of the detected upstream and downstream humidity values VHUMF, VHUMR detected by the upstream and downstream humidity sensors 21, 22, respectively. As a result, this hydrocarbon adsorbent state determining apparatus can also provide similar advantages to those of the hydrocarbon adsorbent state determining apparatus in FIG. 1.

It should be understood that the present invention is not limited to the embodiments described above, but may be practiced in various manners. For example, the flow velocity parameter employed in the foregoing embodiment as indicating the exhaust gas flow velocity is the exhaust gas flow velocity Vgrad which is calculated by dividing the accumulated inflow exhaust gas amount Vex calculated from the engine rotational speed NE and absolute intake inner pressure PBA by a time period. Alternatively, any other parameter may be detected or calculated by an appropriate means. For example, the exhaust gas flow rate may be calculated using an intake air amount detected by an air flow meter, and the fuel injection amount, or a combination of the fuel injection amount and a detected air/fuel ratio. Further alternatively, the exhaust gas flow velocity may be directly detected by a flow velocity sensor. In addition, while in the foregoing embodiment, the exhaust gas flow velocity Vgrad is used to correct the deterioration determination parameter P_TRS, the deterioration determination threshold TRSDT may be corrected instead.

Further, while the foregoing embodiment employs the upstream humidity sensor 21 disposed at a location upstream of the adsorbent 16 in order to more correctly estimate a timing at which exhaust gases actually reach the adsorbent 16, the upstream humidity sensor 21 may be omitted because the downstream humidity sensor 22 alone can estimate the timing without large errors. Also, since the downstream humidity sensor 22 is only required to detect the humidity of exhaust gases which have passed through the adsorbent 16, the downstream humidity sensor 22 may be disposed in the middle of the adsorbent 16 instead of the location downstream of the adsorbent 16 in the foregoing embodiment. Moreover, while the engine water temperature is used as a parameter indicative of a temperature state of the adsorbent upon start of the engine 1, the detected temperature value THCM of the downstream humidity sensor 22 may be used instead of the engine water temperature. Otherwise, details in the configuration can be modified as appropriate without departing from the spirit and scope of the invention.

As described above in detail, the hydrocarbon adsorbent state determining apparatus according to the present invention can advantageously compensate the hydrocarbon adsorbent for fluctuations in its ability to adsorb moisture due to a change in the exhaust gas flow velocity to accurately determine the state of the hydrocarbon adsorbent, including a deterioration, irrespective of a change in the exhaust gas flow velocity.

What is claimed is:

1. A hydrocarbon adsorbent state determining apparatus for determining a state of a hydrocarbon adsorbent disposed in an exhaust system of an internal combustion engine for adsorbing hydrocarbons and moisture within exhaust gases, said apparatus comprising:

humidity detecting means for detecting the humidity of exhaust gases which have passed said hydrocarbon adsorbent;

flow velocity parameter detecting means for detecting a flow velocity parameter indicative of a flow velocity of the exhaust gases; and adsorbent state determining means for determining the state of said hydrocarbon adsorbent in accordance with the detected humidity of the exhaust gases and the flow velocity parameter.

2. A hydrocarbon adsorbent state determining apparatus according to claim 1, wherein said adsorbent state determining means determines the state of said hydrocarbon adsorbent in accordance with a change in a detected value of said humidity detecting means from a start of said internal combustion engine.

3. A hydrocarbon adsorbent state determining apparatus according to claim 2, further comprising:

a temperature state detecting means for detecting a temperature state of said hydrocarbon adsorbent, wherein said adsorbent state determining means determines the state of said hydrocarbon adsorbent in accordance further with the temperature state of said hydrocarbon adsorbent upon start of said internal combustion engine detected by said temperature state detecting means.

4. A hydrocarbon adsorbent state determining apparatus according to claim 1, further comprising:
   upstream humidity detecting means disposed at a location upstream of said hydrocarbon adsorbent in said exhaust system for detecting the humidity of exhaust gases which flow into said hydrocarbon adsorbent, wherein said adsorbent state determining means determines the state of said hydrocarbon adsorbent in accordance further with the humidity detected by said upstream humidity detecting means.

* * * * *